(12) United States Patent
Kitazato

(10) Patent No.: US 8,842,974 B2
(45) Date of Patent: Sep. 23, 2014

(54) CONTENT TRANSMISSION APPARATUS, CONTENT TRANSMISSION METHOD, CONTENT REPRODUCTION APPARATUS, CONTENT REPRODUCTION METHOD, PROGRAM, AND CONTENT DELIVERY SYSTEM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 95 days.

(21) Appl. No.: 13/238,264

(22) Filed: Sep. 21, 2011

(65) Prior Publication Data

US 2012/0082440 A1    Apr. 5, 2012

Related U.S. Application Data

(60) Provisional application No. 61/504,568, filed on Jul. 5, 2011, provisional application No. 61/388,999, filed on Oct. 1, 2010.

(51) Int. Cl.
| | |
|---|---|
| *H04N 5/761* | (2006.01) |
| *G11B 27/034* | (2006.01) |
| *H04N 21/4545* | (2011.01) |
| *H04N 21/44* | (2011.01) |
| *H04N 21/2343* | (2011.01) |

(52) U.S. Cl.
CPC ........ *H04N 21/44008* (2013.01); *G11B 27/034* (2013.01); *H04N 21/45455* (2013.01); *H04N 21/234345* (2013.01)
USPC .......................................... 386/282; 386/219

(58) Field of Classification Search
None
See application file for complete search history.

(56) References Cited

U.S. PATENT DOCUMENTS

| | | |
|---|---|---|
| 2003/0033157 A1 | 2/2003 | Dempski et al. |
| 2003/0037068 A1 | 2/2003 | Thomas et al. |
| 2003/0086003 A1 | 5/2003 | Koga |
| 2006/0194535 A1 | 8/2006 | Houldsworth et al. |
| 2007/0169164 A1 | 7/2007 | Marilly et al. |
| 2008/0028074 A1 | 1/2008 | Ludvig |
| 2008/0120638 A1 | 5/2008 | King et al. |
| 2008/0136963 A1* | 6/2008 | Palfner .......................... 348/448 |
| 2009/0087161 A1 | 4/2009 | Roberts et al. |
| 2009/0125946 A1 | 5/2009 | Fukuda |

(Continued)

FOREIGN PATENT DOCUMENTS

| | | |
|---|---|---|
| EP | 1 389 020 | 2/2004 |
| JP | 2003-9113 | 1/2003 |

(Continued)

OTHER PUBLICATIONS

U.S. Appl. No. 13/238,080, filed Sep. 21, 2011, Kitazato, et al.

(Continued)

*Primary Examiner* — William C Vaughn, Jr.
*Assistant Examiner* — Eileen Adams
(74) *Attorney, Agent, or Firm* — Oblon, Spivak, McClelland, Maier & Neustadt, L.L.P.

(57) ABSTRACT

A content transmission apparatus includes: a retaining section adapted to retain a high-definition video image content; a reception section adapted to receive picture frame information transmitted from a content reproduction apparatus; a calculation section adapted to calculate a cutout range based on the received picture frame information; a cutout section adapted to cut out the calculated cutout range from the retained high-definition video image content; and a signaling section adapted to signal an arbitrary picture frame content configured from a result of the cutout to the content reproduction apparatus.

15 Claims, 9 Drawing Sheets

(56) References Cited

U.S. PATENT DOCUMENTS

| | | | |
|---|---|---|---|
| 2009/0313663 A1 | 12/2009 | Kitazato et al. | |
| 2009/0320064 A1 | 12/2009 | Soldan et al. | |
| 2010/0141772 A1* | 6/2010 | Inaguma et al. | 348/169 |
| 2010/0165129 A1* | 7/2010 | Kondo et al. | 348/208.4 |
| 2010/0205628 A1 | 8/2010 | Davis et al. | |
| 2010/0226591 A1* | 9/2010 | Kameyama | 382/283 |
| 2012/0011261 A1 | 1/2012 | Hirano et al. | |

FOREIGN PATENT DOCUMENTS

| | | |
|---|---|---|
| JP | 2003-18583 | 1/2003 |
| JP | 2003-530033 | 10/2003 |
| JP | 2006-50237 | 2/2006 |
| JP | 2007-116669 | 5/2007 |
| JP | 2008-53916 | 3/2008 |
| JP | 2009-118343 | 5/2009 |
| JP | 2009-118343 A | 5/2009 |
| JP | 2010-288192 | 12/2010 |
| WO | WO 2010/109860 A1 | 9/2010 |

OTHER PUBLICATIONS

U.S. Appl. No. 13/239,871, filed Sep. 22, 2011, Kitazato.
U.S. Appl. No. 13/238,065, filed Sep. 21, 2011, Kitazato.
U.S. Appl. No. 13/238,277, filed Sep. 21, 2011, Kitazato.
U.S. Appl. No. 13/238,138, filed Sep. 21, 2011, Kitazato.
U.S. Appl. No. 13/220,231, filed Aug. 29, 2011, Kitahara, et al.
U.S. Appl. No. 13/071,559, filed Mar. 25, 2011, Yamagishi, et al.
U.S. Appl. No. 13/081,566, Apr. 7, 2011, Kitazato, et al.
U.S. Appl. No. 12/980,917, filed Dec. 29, 2010, Dewa.
U.S. Appl. No. 13/080,866, filed Apr. 6, 2011, Kitazato, et al.
U.S. Appl. No. 13/071,551, filed Mar. 25, 2011, Kitazato, et al.
U.S. Appl. No. 13/071,560, filed Mar. 25, 2011, Yamagishi.
U.S. Appl. No. 13/071,238, filed Mar. 24, 2011, Yamagishi.
U.S. Appl. No. 13/075,440, filed Mar. 30, 2011, Yamagishi, et al.
U.S. Appl. No. 13/107,604, filed May 13, 2011, Dewa.
International Search Report issued Dec. 20, 2011, in PCT/JP2011/071567 (with English-language translation).
International Search Report issued Dec. 20, 2011, in PCT/JP2011/071568 (with English-language translation).
International Search Report issued Dec. 27, 2011, in PCT/JP2011/071569 (with English-language translation).
International Search Report issued Dec. 27, 2011, in PCT/JP2011/071570 (with English-language translation).
Hideaki Kimata, "Movement on MPEG 3DAV toward International Standardization of 3D Video", IPSJ SIG Technical Reports, vol. 2005, No. 23, Mar. 10, 2005, pp. 49-54.
U.S. Appl. No. 13/422,203, filed Mar. 16, 2012, Kitazato, et al.
U.S. Appl. No. 13/452,376, filed Apr. 20, 2012, Kitahara, et al.
U.S. Appl. No. 13/554,688, filed Jul. 20, 2012, Kitazato, et al.
International Search Report Issued Jul. 17, 2012 in PCT/JP2012/064806 (with English translation).
Kentaro Yamazaki, "Open House 2011. Linking the TV and the SNA [Hybridcast]", http://av.watch.impress.co.jp/docs/news/20110524_448049.html published on web May 24, 2011, 6 pages.
International Search Report issued Nov. 29, 2011 in patent application No. PCT/JP2011/071566 filed Sep. 22, 2011 with English translation.
Extended European Search Report issued Feb. 6, 2014 in Patent Application No. 11828915.6.
Office Action issued Feb. 20, 2014 in Japanese Patent Application No. 2013-520530 (with English language translation).
Extended European Search Report issued Feb. 26, 2014 in Patent Application No. 11828910.7.
Extended European Search Report issued Mar. 6, 2014 in Patent Application No. 11828911.5 Additional References sheet(s) attached.
Extended European Search Report issued May 12, 2014 in European Application No. 11828914.9.
Extended European Search Report issued May 8, 2014 in European Application No. 11828912.3.

* cited by examiner

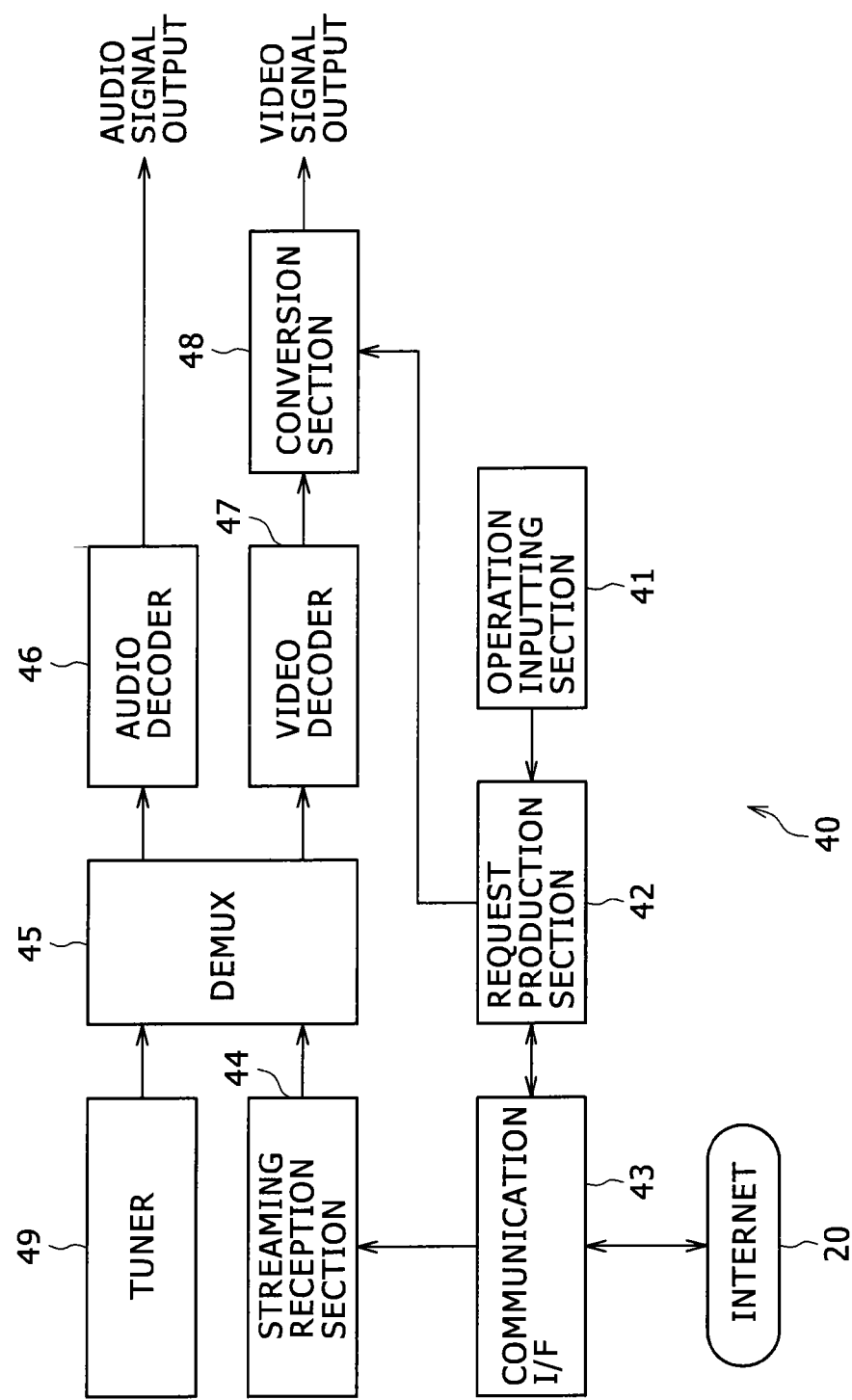

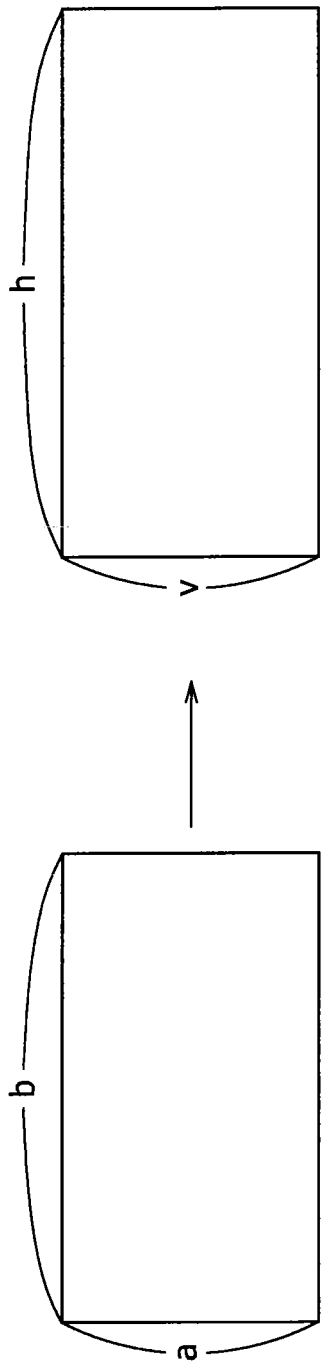

EXAMPLE OF DESCRIPTION IN HTTP

```
GET http://xxx.com/yyy.mp4 HTTP/1.1
X-SpatialRange:x1=100 y1=200 a=576 b=864 rateX=20 rateY=30 rateZ=1.0
```

FIG. 6A

```
Http/1.1 200 OK
X-SpatialRange:x1=100 y1=200 a=576 b=864 rateX=20 rateY=30 rateZ=1.0
```

FIG. 6B

EXAMPLE OF DESCRIPTION IN RTSP/RTP

```
PLAY rtsp:://xxx.com/yyy PTSP/1.
CSeq:933
Session:13820894
Range:smpte=0:10:20-:time=20110423T153600Z
X-SpatialRange:x1=100 y1=200 a=576 b=864 rateX=20 rateY=30 rateX=1.0
```

FIG. 7A

```
PTSP/1.0 200 OK
CSeq:933
Date:23 Apr 2011 15:35:08 GMT
Range:smpte=0:10:20-;time=201104423T153600Z
X-SpatialRange:X1=100 y1=200 a=576 b=864 rateX=20 rateY=30 rateZ=1.0 A=1080 B=1920
```

FIG. 7B

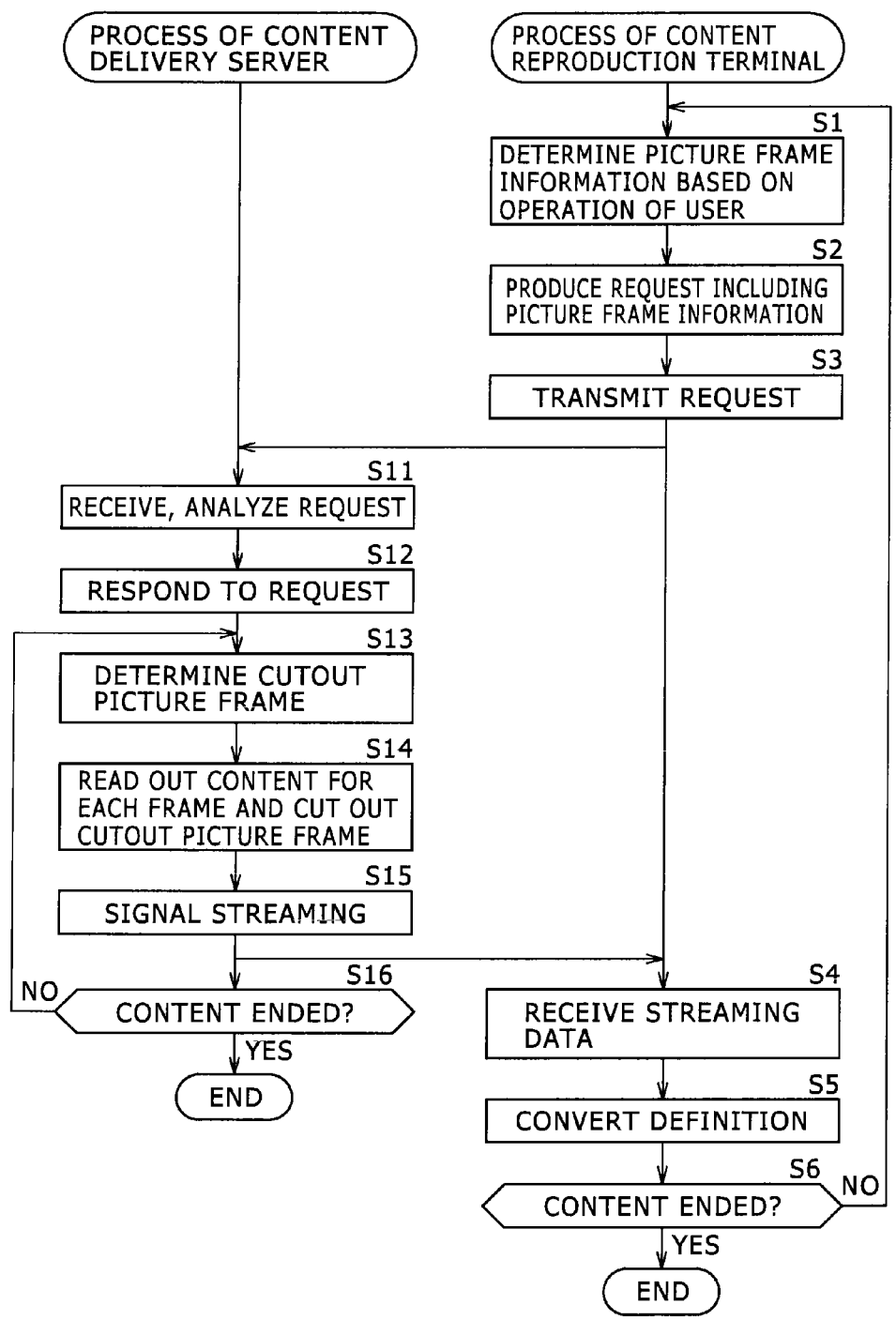

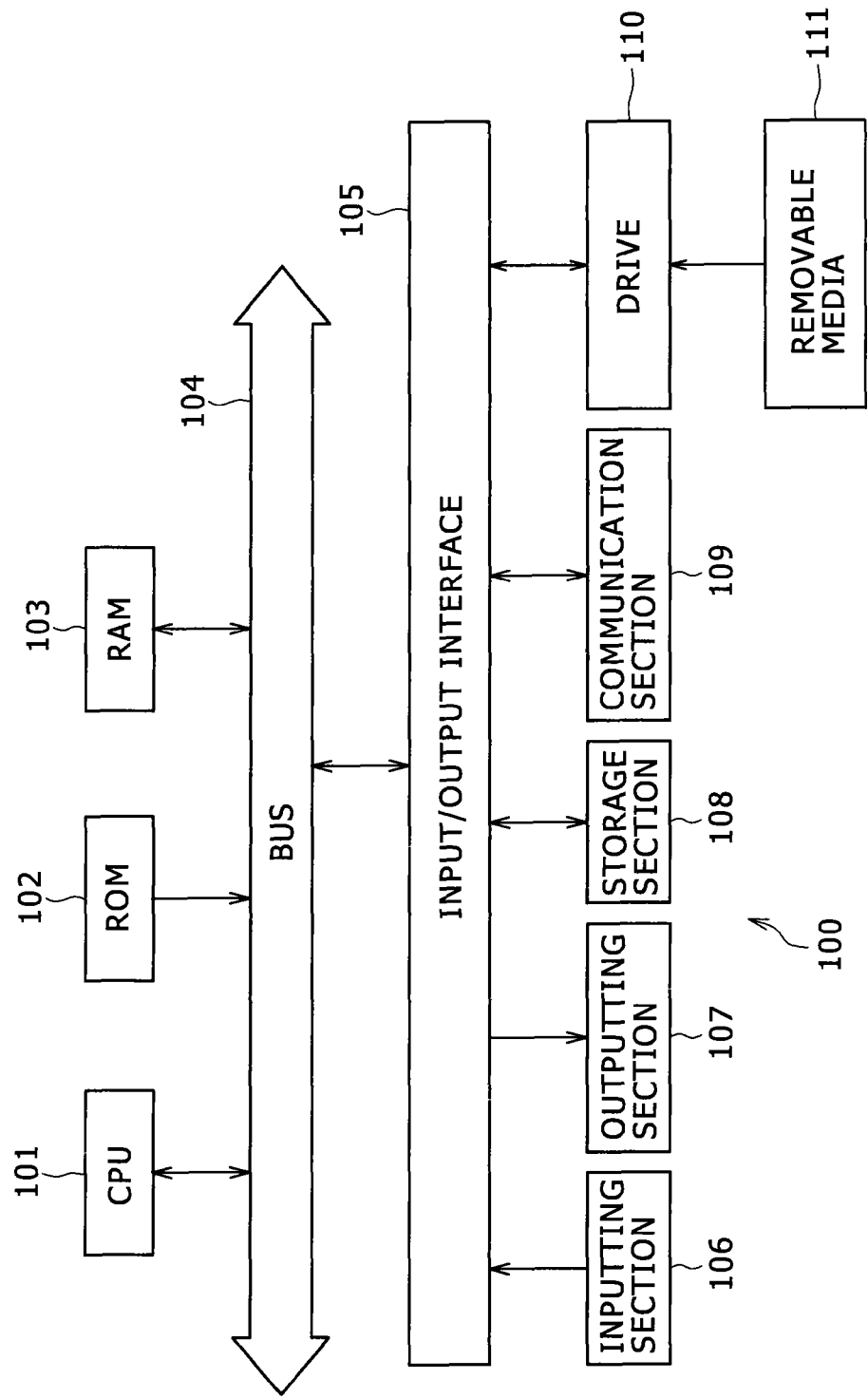

CONTENT TRANSMISSION APPARATUS, CONTENT TRANSMISSION METHOD, CONTENT REPRODUCTION APPARATUS, CONTENT REPRODUCTION METHOD, PROGRAM, AND CONTENT DELIVERY SYSTEM

CROSS-REFERENCE TO RELATED APPLICATION

This application claims the benefit of priority of Provisional Application Ser. Nos. 61/388,999, filed Oct. 1, 2010 and 61/504,568, filed Jul. 5, 2011, the entire contents of which is incorporated herein by reference.

BACKGROUND

The present disclosure relates to a content transmission apparatus, a content transmission method, a content reproduction apparatus, a content reproduction method, a program, and a content delivery system, and particularly to a content transmission apparatus, a content transmission method, a content reproduction apparatus, a content reproduction method, a program, and a content delivery system wherein the user of the content reproduction apparatus can enjoy a content with an arbitrary picture frame.

In related art, in a video content delivery service represented by a video on demand service through a television broadcast, the Internet or the like, it is possible for a viewer to view a video image content only with a picture frame produced by the broadcasting side.

It is to be noted that some of video contents which use package media such as a DVD (digital versatile disc) or a BD (blu-ray disc) include those video contents in which a plurality of video images obtained by imaging a sports event, a concert place or the like, which is determined as an image pickup object, from a plurality of different viewpoints (angles) (so-called multi-angle video image) (refer to, for example, Japanese Patent Laid-Open No. 2009-135946).

In the case where a video image content ready for a multi-angle video image is reproduced, a viewer can select and view one of the plural video images. However, even in the case of a video image content ready for a multi-angle video image, the viewer cannot view a video image with an arbitrary picture frame, that is, in a state in which it is picked up from an arbitrary viewpoint.

SUMMARY

Incidentally, with regard to video contents, appearance of such a viewing form that not only a video image of a broadcasted picture frame or video images of multi-angles prepared in advance can be selected but also a video image picked up from an arbitrary picture frame conforming to the liking of each viewer can be viewed is demanded. In particular, there is a request to enjoy, for example, in a video image content of a sports event, noticing only a specific player, or enjoy, in a video image content of a concert hall, noticing only the right side of a stage.

The present disclosure has been made in view of such a situation as described above, and it is made possible to allow enjoyment of a video image content with an arbitrary picture frame.

A content transmission apparatus according to a first embodiment of the present disclosure includes a retaining section adapted to retain a high-definition video image content, a reception section adapted to receive picture frame information transmitted from a content reproduction apparatus, a calculation section adapted to calculate a cutout range based on the received picture frame information, a cutout section adapted to cut out the calculated cutout range from the retained high-definition video image content, and a signaling section adapted to signal an arbitrary picture frame content configured from a result of the cutout to the content reproduction apparatus.

The calculation section may calculate the cutout range for each frame based on the received picture frame information, and the cutout section may cut out the cutout range calculated for each frame from each frame of the retained high-definition video image content.

The content transmission apparatus according to the first embodiment of the present disclosure may further include a conversion section adapted to convert the definition of the retained high-definition video image content into a full picture frame content, and the signaling section may deliver the produced full picture frame content.

The picture frame information may include an initial position of the cutout range and a moving amount per unit time.

The picture frame information may further include an enlarging or reducing amount of the cutout range per unit time.

A content transmission method for a content transmission apparatus according to a first embodiment of the present disclosure includes receiving picture frame information transmitted from a content reproduction apparatus, calculating a cutout range based on the received picture frame information, cutting out the calculated cutout range from a retained high-definition video image content, and signaling an arbitrary picture frame content configured from a result of the cutout to the content reproduction apparatus, carried out by the content transmission apparatus.

A program according to the first embodiment of the present disclosure causes a computer to function as a retaining section adapted to retain a high-definition video image content, a reception section adapted to receive picture frame information transmitted from a content reproduction apparatus, a calculation section adapted to calculate a cutout range based on the received picture frame information, a cutout section adapted to cut out the calculated cutout range from the retained high-definition video image content, and a signaling section adapted to signal an arbitrary picture frame content configured from a result of the cutout to the content reproduction apparatus.

In the first embodiment of the present disclosure, picture frame information transmitted from the content reproduction apparatus is received, and a cutout range is calculated based on the received picture frame information. Further, the calculated cutout range is cut out from the retained high-definition video image content, and an arbitrary picture frame content configured from a result of the cutout is signaled to the content reproduction apparatus.

A content reproduction apparatus according to a second embodiment of the present disclosure includes an operation inputting section adapted to input an operation of a user for designating an arbitrary cutout range on a screen of a video image content, a production section adapted to produce picture frame information based on the inputted operation, a transmission section adapted to transmit the produced picture frame information to a content transmission apparatus, and a reception section adapted to receive an arbitrary picture frame content which is signaled from the content transmission apparatus in response to the transmitted picture frame information and whose cutout range designated by the user is cut out from the video image content.

The content reproduction apparatus according to the second embodiment of the present disclosure may further include a conversion section adapted to convert the definition of the received arbitrary picture frame content.

The picture frame information may include an initial position of the cutout range and a moving amount per unit time.

The picture frame information may further include an enlarging or reducing amount of the cutout range per unit time.

A content reproduction method for a content reproduction apparatus according to the second embodiment of the present disclosure may include inputting an operation of a user for designating an arbitrary cutout range on a screen of a video image content, producing picture frame information based on the inputted operation, transmitting the produced picture frame information to a content transmission apparatus, and receiving an arbitrary picture frame content which is signaled from the content transmission apparatus in response to the transmitted picture frame information and whose cutout range designated by the user is cut out from the video image content, carried out by the content reproduction apparatus.

A program according to the second embodiment of the present disclosure causes a computer to function as an operation inputting section adapted to input an operation of a user for designating an arbitrary cutout range on a screen of a video image content, a production section adapted to produce picture frame information based on the inputted operation, a transmission section adapted to transmit the produced picture frame information to a content transmission apparatus, and a reception section adapted to receive an arbitrary picture frame content which is signaled from the content transmission apparatus in response to the transmitted picture frame information and whose cutout range designated by the user is cut out from the video image content.

In the second embodiment of the present disclosure, an operation of a user for designating an arbitrary cutout range is inputted on a screen of a video image content, and picture frame information is produced based on the inputted operation. Further, the produced picture frame information is transmitted to a content transmission apparatus. Further, an arbitrary picture frame content which is signaled from the content transmission apparatus in response to the transmitted picture frame information and whose cutout range designated by the user is cut out from the video image content is received.

A content delivery system according to a third embodiment of the present disclosure is configured from a content transmission apparatus and a content reproduction apparatus. The content transmission apparatus includes a retaining section adapted to retain a high-definition video image content, a reception section adapted to receive picture frame information transmitted from a content reproduction apparatus, a calculation section adapted to calculate a cutout range based on the received picture frame information, a cutout section adapted to cut out the calculated cutout range from the retained high-definition video image content, and a signaling section adapted to signal an arbitrary picture frame content configured from a result of the cutout to the content reproduction apparatus. The content reproduction apparatus includes an operation inputting section adapted to input an operation of a user for designating an arbitrary cutout range on a screen of a video image content, a production section adapted to produce picture frame information based on the inputted operation, a transmission section adapted to transmit the produced picture frame information to the content transmission apparatus, and a reception section adapted to receive the arbitrary picture frame content signaled from the content transmission apparatus in response to the transmitted picture frame information.

In the third embodiment of the present disclosure, by the content transmission apparatus, picture frame information transmitted from a content reproduction apparatus is received; a cutout range is calculated based on the received picture frame information; the calculated cutout range is cut out from the retained high-definition video image content; and an arbitrary picture frame content configured from a result of the cutout is signaled to the content reproduction apparatus. Further, by the content reproduction apparatus, an operation of a user for designating an arbitrary cutout range is inputted on a screen of a video image content; picture frame information is produced based on the inputted operation; the produced picture frame information is transmitted to the content transmission apparatus; and the arbitrary picture frame content signaled from the content transmission apparatus in response to the transmitted picture frame information is received.

With the first embodiment of the present disclosure, a video image content can be transmitted with a picture frame in accordance with a request from the reception side.

With the second embodiment of the present disclosure, an arbitrary picture frame content obtained by cutting out an arbitrary picture frame from a video image content can be received and reproduced.

With the third embodiment of the present disclosure, an arbitrary picture frame content obtained by cutting out an arbitrary picture frame from a video image content can be provided to a viewer.

BRIEF DESCRIPTION OF THE DRAWINGS

FIG. 4 is a block diagram showing an example of a configuration of a content reproduction terminal;

FIG. 5 is a view illustrating conversion of a picture frame and a definition in the content reproduction terminal;

FIGS. 6A and 6B are views illustrating an example of a request from the content reproduction terminal and description by HTTP of a response to the request;

FIGS. 7A and 7B are views illustrating an example of a request from the content reproduction terminal and description by RTSP/RTP of a response to the request;

FIG. 8 is a flow chart illustrating operation of the content delivery system; and FIG. 9 is a block diagram showing an example of a configuration of a computer.

DETAILED DESCRIPTION OF THE PREFERRED EMBODIMENT

In the following, the best mode (hereinafter referred to as embodiment) for carrying out the present disclosure is described in detail with reference to the drawings.

1. Embodiment

Example of the Configuration of the Content Delivery System

Figure 1:
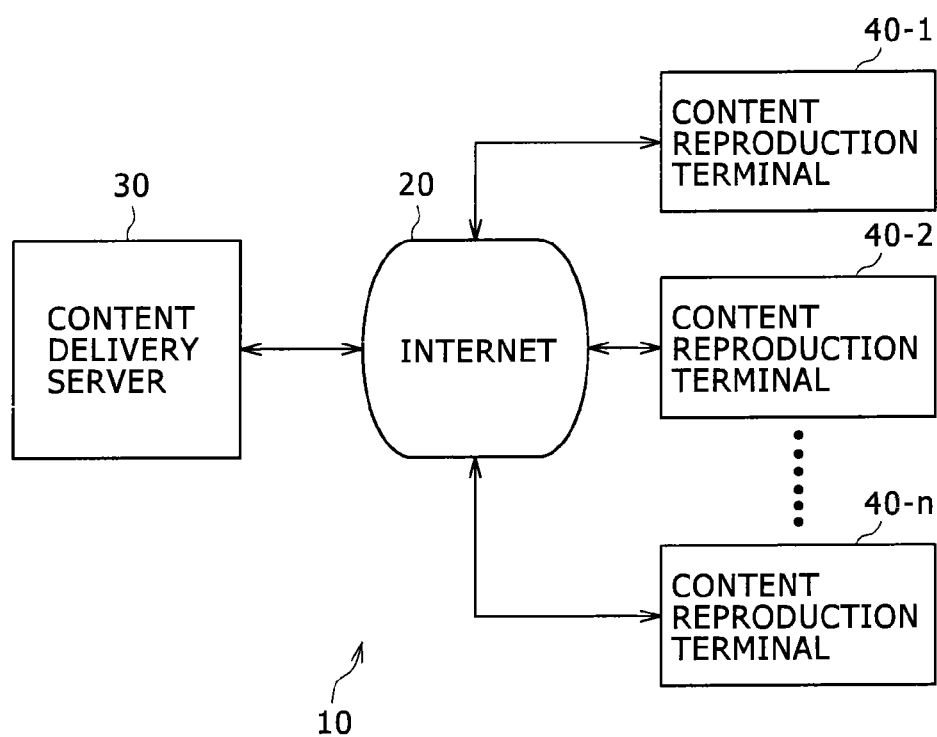
FIG. 1 is a block diagram showing an example of a configuration of a content delivery system according to an embodiment of the present disclosure.

FIG. 1 shows an example of a configuration of a content delivery system which is an embodiment of the present disclosure. The content delivery system is configured from a content delivery server 30 and content reproduction terminals 40-1 to 40-n connected to the content delivery server 30 through the Internet 20. In the case where there is no necessity in the following description to individually distinguish the content reproduction terminals 40-1 to 40-n from each other, any of the content reproduction terminals 40-1 to 40-n is referred to simply as content reproduction terminal 40.

The content delivery server 30 retains a video image content obtained by overlook image pickup such that an entire space of an image pickup target (a sports event, a concert hall or the like) is included within an image pickup range. The video image content is picked up using more than one high-definition (4000×2000 or more) video camera represented by a super high vision (SHV: Super Hi-Vision) camera or the like.

The content delivery server 30 converts the retained high-definition video image content into a video image content having a predetermined definition (resolution) with which it can be displayed by any content reproduction terminal 40 and delivers the converted content as a full picture frame content to the content reproduction terminal 40 through the Internet 20. Further, the content delivery server 30 cuts out a designated picture frame from the retained high-definition video image content in response to a request from the content reproduction terminal 40-i based on the full picture frame content and supplies the cut out picture frame as an arbitrary picture frame content to the content reproduction terminal 40-i through the Internet 20.

Figure 2:
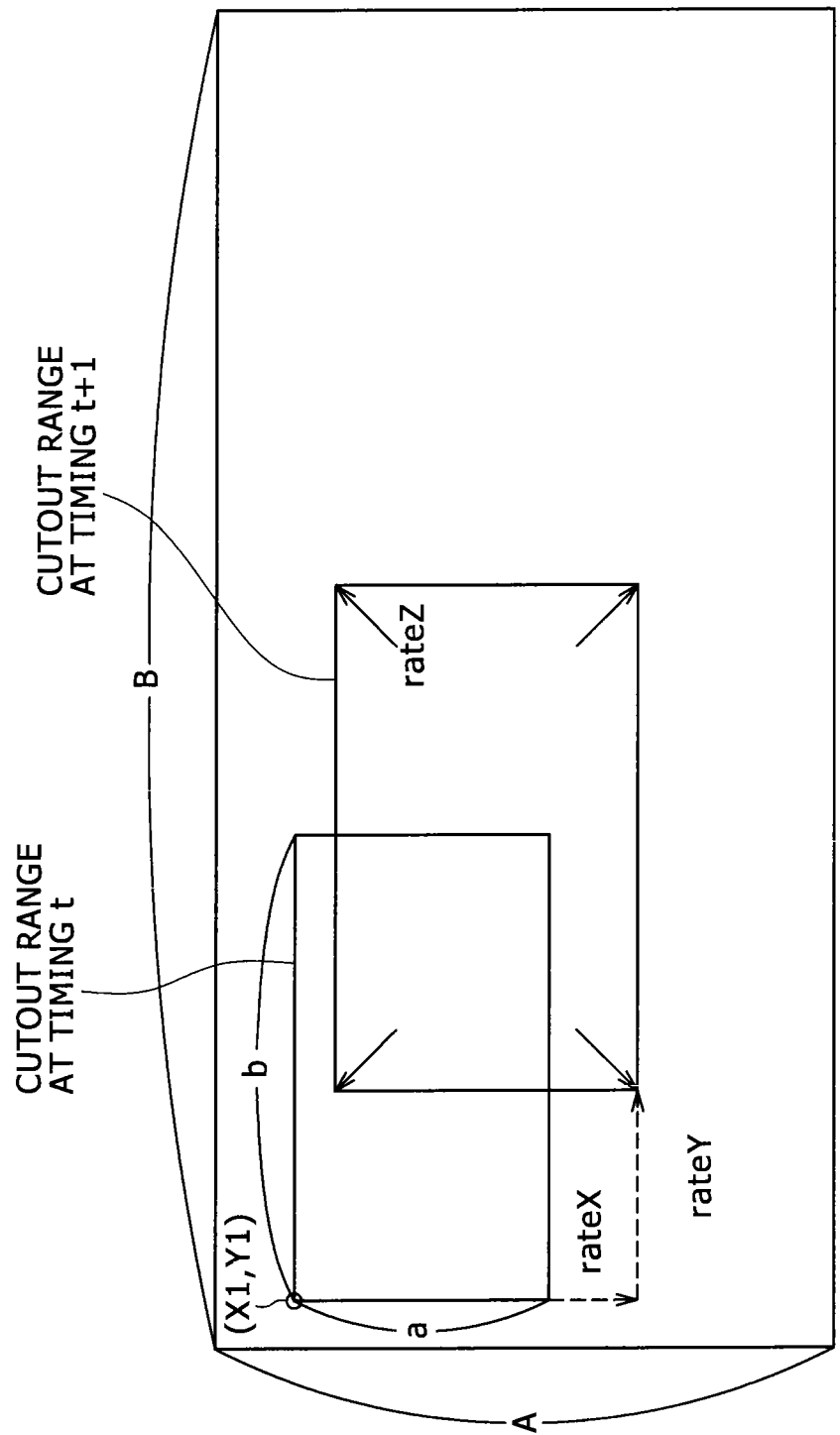
FIG. 2 is a view illustrating a relationship between a picture frame to be picked up and another picture frame to be supplied to the reception side.

FIG. 2 illustrates a relationship between a picture frame (vertical magnitude A×transverse magnitude B) of a high-definition video image content retained by the content delivery server 30 and another picture frame (vertical magnitude a×transverse magnitude b) of an arbitrary picture frame content cut out from the picture frame and supplied to the content reproduction terminal 40.

In the content reproduction terminal 40, a range (hereinafter referred to as cutout range) to be noticed from the full picture frame video image content by the user can be designated by an arbitrary panning (transverse direction moving) operation, a tilt (vertical direction moving) operation and a zoom (enlarging or reducing) operation.

If a cutout range is designated at a timing t from within the full picture frame video image content, then a notification of picture frame information (a coordinate (X1, Y1) of the left upper corner, a length a in the vertical direction and a length b in the transverse direction of the cutout range) which indicates the cutout range is issued as a request to the content delivery server 30. Further, as the picture frame information, a notification of a vertical direction moving amount rateX, a transverse direction moving amount rateY and an enlarging and reducing amount rateZ for one second is issued to the content delivery server 30 in a state in which it is included in the request based on the cutout range designated at a timing t+1 later by one second.

In the content delivery server 30, based on the left upper corner coordinate (X1, Y1), vertical direction length a and transverse direction length b of the cutout range of the picture frame information included in the request received as the notification, a frame at the top of the arbitrary picture frame content is cut out from the retained high-definition video image content, and succeeding frames to the cut out frame are cut out based on rateX, rateY and rateZ. The cut out frames are supplied as stream data to the content reproduction terminal 40.

Example of the Configuration of the Content Delivery Server 30

Figure 3:
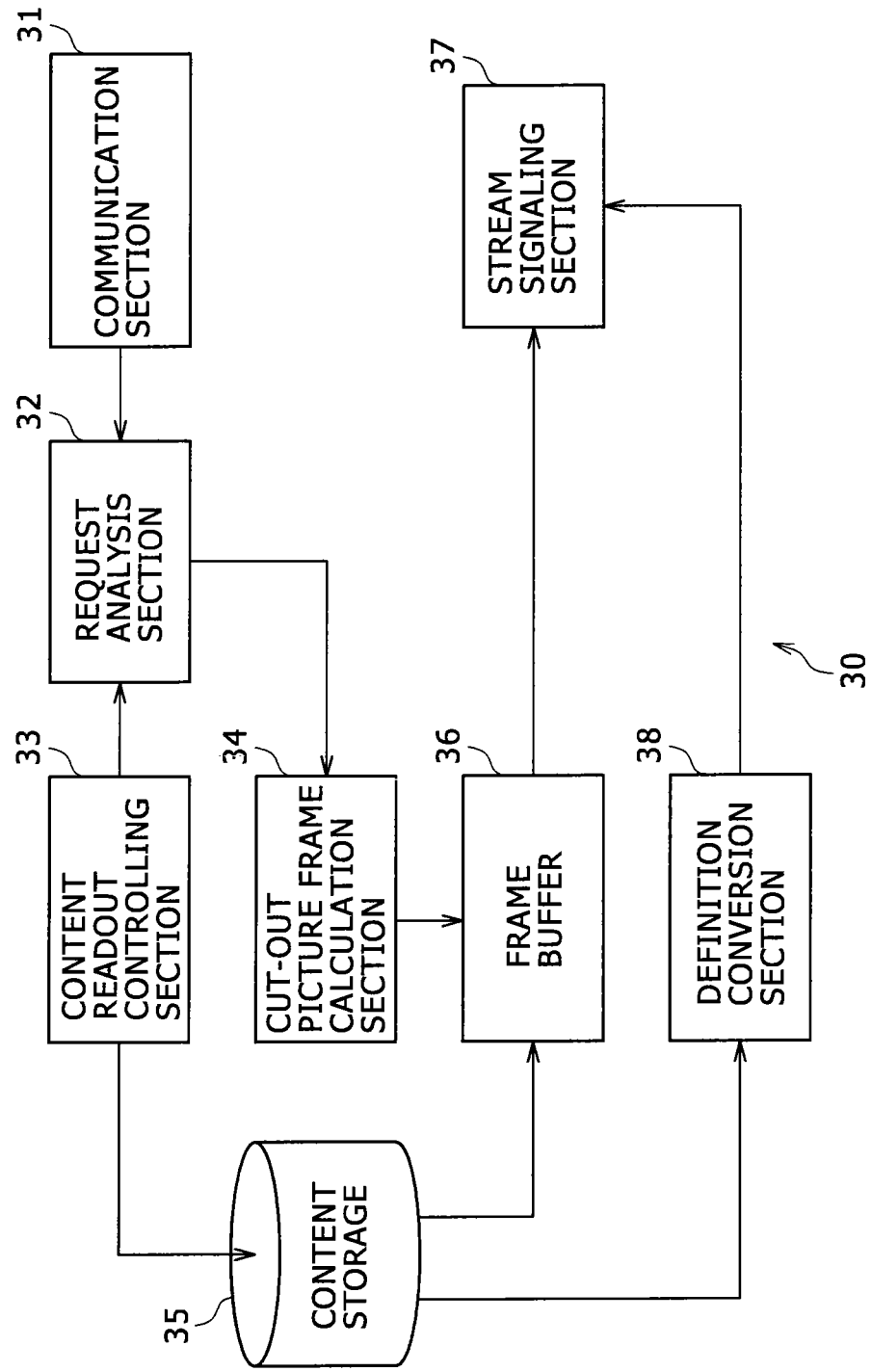
FIG. 3 is a block diagram showing an example of a configuration of a content delivery server.

FIG. 3 shows an example of a configuration of the content delivery server 30. The content delivery server 30 includes a communication section 31, a request analysis section 32, a content readout controlling section 33, a cutout picture frame calculation section 34, a content storage 35, a frame buffer 36, a stream signaling section 37, and a definition conversion section 38.

The communication section 31 receives a request from the content reproduction terminal 40-i connected through the Internet 20 and outputs the received request to the request analysis section 32. Further, the communication section 31 transmits a response to the request produced by and supplied from the request analysis section 32 to the content reproduction terminal 40-i, which has transmitted the request, through the Internet 20.

The request analysis section 32 produces a response to the request from the content reproduction terminal 40 and supplies the produced response to the communication section 31. Further, the request analysis section 32 analyzes the request from the content reproduction terminal 40 and specifies a high-definition video image content, which makes a cutout source, as a result of the analysis and then issues a notification of the specified video image content to the content readout controlling section 33. Further, the request analysis section 32 outputs picture frame information (left upper corner coordinate (X1, Y1), vertical direction length a, transverse direction length b, vertical direction moving amount rateX, transverse direction moving amount rateY and enlarging or reducing amount rateZ) as a result of the analysis to the cutout picture frame calculation section 34.

The content readout controlling section 33 controls the content storage 35 to output the high-definition video image content, which is retained by the content storage 35 and makes a cutout source, to the frame buffer 36.

The cutout picture frame calculation section 34 calculates a cutout range from each frame of the high-definition video image content which makes a cutout source, for each frame based on the picture frame information inputted as a result of the analysis by the request analysis section 32 and issues a notification of the calculated cutout range to the frame buffer 36.

The content storage 35 retains the high-definition video image content.

The frame buffer 36 cuts out a cutout range for each frame received as a notification from the cutout picture frame calculation section 34 from each frame of the high-definition video image content, which makes a cutout source, and outputs the cut out cutout range to the stream signaling section 37.

The stream signaling section 37 delivers the full picture frame content inputted from the definition conversion section 38 as streaming data to the content reproduction terminal 40 through the Internet 20. Further, the stream signaling section 37 transmits an arbitrary picture frame content using, as a frame, the cutout range cut out from the high-definition video image content, which makes a cutout source, as streaming data to the content reproduction terminal 40-i which has transmitted the request through the Internet 20.

The definition conversion section 38 outputs the high-definition video image content from the content storage 35 to the stream signaling section 37.

Example of the Configuration of the Content Reproduction Terminal 40

FIG. 4 shows an example of a configuration of the content reproduction terminal 40. The content reproduction terminal 40 includes an operation inputting section 41, a request production section 42, a communication interface (I/F) 43, a streaming reception section 44, a demultiplexing section (DEMUX) 45, an audio decoder 46, a video decoder 47, a conversion section 48, and a tuner 49.

The operation inputting section 41 is configured, for example, from a remote controller, a reception section from the remote controller (both not shown) and so forth, and accepts an operation by the user for designating a position or a size of a cutout range on a displayed full picture frame content and issues a notification of the accepted operation to the request production section 42.

The request production section 42 produces a request including picture frame information representative of a cutout range and information for specifying a high-definition video image content, which makes a cutout source, based on the cutout range designated using the operation inputting section 41 and transmits the produced request from the communication I/F 43 to the content delivery server 30 through the Internet 20.

FIGS. 6A and 6B illustrate an example of a request produced by the request production section 42 and description by HTTP of a response to the request by the request analysis section 32.

FIGS. 7A and 7B show an example of a request produced by the request production section 42 and description by RTSP/RTP of a response to the request by the request analysis section 32. In the case where RTSP/RTP is used, a start timing when an arbitrary picture frame is cut out from the high-definition video image content, which makes a cutout source, can be designated.

The communication I/F 43 is connected to the content delivery server 30 through the Internet 20.

The streaming reception section 44 receives the full picture frame content streaming-delivered from the content delivery server 30 through the Internet 20 and the communication I/F 43 and outputs the received content to the demultiplexing section 45. Further, the streaming reception section 44 receives an arbitrary picture frame content streaming-signaled from the content delivery server 30 through the Internet 20 and the communication I/F 43 and outputs the received content to the demultiplexing section 45.

The demultiplexing section 45 demultiplexes audio coded data or video coded data from the full picture frame content or the arbitrary picture frame content inputted from the streaming reception section 44 or a broadcasting content inputted from the tuner 49. The demultiplexing section 45 outputs the demultiplexed audio coded data and video coded data to the audio decoder 46 and the video decoder 47, respectively.

The audio decoder 46 decodes the inputted audio coded data and outputs an audio signal obtained as a result of the decoding to a monitor (not shown) at the succeeding stage. The video decoder 47 decodes the inputted video coded data and outputs a video signal obtained as a result of the decoding to the conversion section 48. The conversion section 28 converts the definition (resolution) and the aspect ratio of the video signal inputted from the video decoder 47 so that the video signal can be displayed on the monitor at the succeeding stage and outputs the result of the conversion to the succeeding stage so as to be displayed.

For example, where the resolution with which the video signal can be displayed on the monitor at the succeeding stage is a vertical magnitude v×transverse magnitude h, the arbitrary picture frame content of a vertical magnitude a×transverse magnitude b is converted into a content of a vertical magnitude v×transverse magnitude h as shown in FIG. 5.

The tuner 49 receives a broadcasting content as a television program and outputs the received content to the demultiplexing section 45. It is to be noted that a full picture frame content corresponding to the high-definition video image content, which makes a cutout source of the arbitrary picture frame content, may be broadcasted as a broadcasting content.

It is to be noted that the content reproduction terminal 40 itself may be commercialized as a unit apparatus or may be built in a television receiver or a video recorder.

[Description of Operation]

Next, FIG. 8 is a flow chart illustrating operation of the content delivery system 10.

As a premise, it is assumed that a full picture frame content is delivered already from the content delivery system 10 and the delivered content is received and reproduced by the content reproduction terminal 40-$i$.

In the content reproduction terminal 40-1, at step S1, if the user operates the operation inputting section 41 to designate a position or a size of a cutout range on a full picture frame content, then a notification of the operation is issued to the request production section 42. At step S2, the request production section 42 produces a request including picture frame information indicative of a cutout range and information for specifying the high-definition video image content, which makes a cutout source, based on the cutout range designated using the operation inputting section 41. At step S3, the request production section 42 transmits the produced request from the communication I/F 43 to the content delivery server 30 through the Internet 20.

On the other hand, in the content delivery server 30, at step S11, the communication section 31 receives the request transmitted from the content reproduction terminal 40 through the Internet 20 and outputs the received request to the request analysis section 32. The request analysis section 32 analyzes the request from the content reproduction terminal 40 and specifies the high-definition video image content, which makes a cutout source, as a result of the analysis and then issues a notification of the result of the analysis to the content readout controlling section 33. At step S12, the request analysis section 32 produces and supplies a response to the request from the content reproduction terminal 40 to the communication section 31. The communication section 31 transmits the response to the request to the content reproduction terminal 40-$i$ which has transmitted the request through the Internet 20.

At step S13, the cutout picture frame calculation section 34 calculates a cutout range from each frame of the high-definition video image content, which makes a cutout source, for each frame based on the picture frame information inputted as the result of the analysis by the request analysis section 32 and issues a notification of the result of the calculation to the frame buffer 36.

In particular, regarding a first frame, a region having a diagonal line from a left upper corner coordinate (X1, Y1) to a right lower corner coordinate (X1+a, Y1+b) is determined as the cutout region. Regarding a kth frame beginning with the second frame, in the case where the frame rate is 30 frames/second, a region having a diagonal line from a left upper corner coordinate (X1+rateX/30, Y1+rateY/30) to a right lower corner coordinate (X1+rateX/30+a·rateZ/30, Y1+rateY/30+b·rateZ/30) is calculated as the cutout range.

At step S14, the content storage 35 outputs the retained high-definition picture content to the frame buffer 36 under the control of the content readout controlling section 33. The frame buffer 36 cuts out a cutout range for each frame received as a notification from the cutout picture frame calculation section 34 from each frame of the high-definition picture content, which makes a cutout source, and outputs the cutout range to the stream transmission section 37.

At step S15, the stream transmission section 37 signals the arbitrary picture frame content wherein a frame is formed from the cutout range cut out from the high-definition picture content, which makes a cutout source, as streaming data to the content reproduction terminal 40-$i$ through the Internet 20. It is to be noted that the processes as steps S13 to S15 are repetitively carried out until the content comes to an end.

In the content reproduction terminal 40, at step S4, the streaming reception section 44 receives the arbitrary picture frame content streaming-signaled from the content delivery server 30 through the Internet 20 and the communication I/F 43 and outputs the received content to the demultiplexing section 45. The demultiplexing section 45 demultiplexes audio coded data and video coded data from the arbitrary picture frame content, and outputs the audio coded data to the audio decoder 46 and outputs the video coded data to the video decoder 47. The audio decoder 46 decodes the audio coded data and outputs an audio signal obtained as a result of the decoding to the monitor (not shown) at the succeeding stage. The video decoder 47 decodes the inputted video coded data and outputs a video signal obtained as a result of the decoding to the conversion section 48.

At step S5, the conversion section 28 converts the definition (resolution) and the aspect ratio of the video signal inputted thereto from the video decoder 47 so that the video signal can be displayed on the monitor at the succeeding stage, and outputs the result of the conversion to the succeeding stage so as to be displayed. Thereafter, by continuation of the picture frame cutout operation by the user, the processes at steps S1 to S5 are repetitively carried out until the content comes to an end.

The description of operation of the content delivery system 10 ends therewith. As described above, with the content delivery system 10, the user of the content reproduction terminal 40 can designate an arbitrary region of a full picture frame content as a cutout range and view the arbitrary picture frame content signaled from the content delivery server 30 and formed from the cutout range.

It is to be noted that, if a notification of picture frame information is issued to the content delivery server 30 for every several seconds, then the user of the content reproduction terminal 40 can always enjoy an arbitrary picture frame content conforming to the intention of the user itself.

Consequently, for example, the user of the content reproduction apparatus 40 can enjoy, by using a remote controller to carry out panning, tilting or zooming of a full picture frame content which relays a game of the football, a video image noticing a specific player.

It is to be noted that, on the screen of the content reproduction apparatus 40, a full picture frame content and an arbitrary picture frame content may be displayed simultaneously.

Incidentally, while the series of processes described above can be executed by hardware, it may otherwise be executed by software. In the case where the series of processes is executed by software, a program which constructs the software is installed from a program recording medium into a computer incorporated in hardware for exclusive use, a personal computer, for example, for universal use which can execute various functions by installing various programs, and so forth.

FIG. 9 is a block diagram showing an example of a hardware configuration of a computer which executes the series of processes described hereinabove in accordance with a program.

In this computer 100, a CPU (Central Processing Unit) 101, a ROM (Read Only Memory) 102 and a RAM (Random Access Memory) 103 are connected to each other by a bus 104.

Further, an input/output interface 105 is connected to the bus 104. An inputting section 106 including a keyboard, a mouse, a microphone and so forth, an outputting section 107 including a display unit, a speaker and so forth, a storage section 108 formed from a hard disk, a nonvolatile memory, or the like, a communication section 109 formed from a network interface or the like, and a drive 110 for driving a removable medium 111 such as a magnetic disk, an optical disk, a magneto-optical disk or a semiconductor memory are connected to the input/output interface 105.

In the computer 100 configured in such a manner as described above, the CPU 101 loads a program stored, for example, in the storage section 108 into the RAM 103 through the input/output interface 105 and the bus 104 and executes the program to carry out the series of processes described above.

It is to be noted that the program to be executed by the computer may be a program of the type by which the processes are carried out in a time series in the order as described in the present specification or a program of the type by which the processes are executed in parallel or executed individually at necessary timings such as when the process is called.

Further, the program may be of the type which is processed by a single computer or may be of the type which is carried out by distributed processing by a plurality of computers. Further, the program may be transferred to and executed by a computer at a remote place.

Further, in the present specification, the term system is used to represent an entire apparatus composed of a plurality of apparatus.

It is to be noted that the embodiment of the present disclosure is not limited to the embodiment described hereinabove but can be altered in various manners without departing from the subject matter of the present disclosure.

What is claimed is:

1. A content transmission apparatus, comprising:
   circuitry configured to
     retain a high-definition video image content;
     receive picture frame information transmitted from a content reproduction apparatus, the picture frame information defining a user-defined sub-region of the high-definition video image content;
     calculate a cutout range corresponding to the user-defined sub-region of the high-definition video image content based on the received picture frame information, the received picture frame information including a user-defined position of the cutout range;
     cut out the calculated cutout range from the high-definition video image content; and
     signal an arbitrary picture frame content configured from a result of the cutout, from the high-definition video image content, to the content reproduction apparatus.

2. The content transmission apparatus according to claim 1, wherein
   said circuitry calculates the cutout range for each frame based on the received picture frame information, and said circuitry cuts out the cutout range calculated for each frame from each frame of the high-definition video image content.

3. The content transmission apparatus according to claim 2, wherein the circuitry is further configured to
convert the definition of the high-definition video image content into a full picture frame content; and
deliver the produced full picture frame content.

4. The content transmission apparatus according to claim 2, wherein
the user-defined position is an initial position of the cutout range, and
the picture frame information further includes a moving amount per unit time.

5. The content transmission apparatus according to claim 4, wherein the picture frame information further includes an enlarging or reducing amount of the cutout range per unit time.

6. A content transmission method for a content transmission apparatus, comprising:
receiving picture frame information transmitted from a content reproduction apparatus, the picture frame information defining a user-defined sub-region of a high-definition video image content;
calculating, by circuitry of the content transmission apparatus, a cutout range corresponding to the user-defined sub-region of the high-definition video image content based on the received picture frame information, the received picture frame information including a user-defined position of the cutout range;
cutting out, by the circuitry of the content transmission apparatus, the calculated cutout range from the high-definition video image content; and
signaling an arbitrary picture frame content configured from a result of the cutout, from the high-definition video image content, to the content reproduction apparatus.

7. A non-transitory computer-readable storage medium storing a program for causing a computer to perform a content transmission method comprising:
receiving picture frame information transmitted from a content reproduction apparatus, the picture frame information defining a user-defined sub-region of a high-definition video image content;
calculating, by the computer, a cutout range corresponding to the user-defined sub-region of the high-definition video image content based on the received picture frame information, the received picture frame information including a user-defined position of the cutout range;
cutting out, by the computer, the calculated cutout range from the high-definition video image content; and
signaling an arbitrary picture frame content configured from a result of the cutout, from the high-definition video image content, to the content reproduction apparatus.

8. A content reproduction apparatus, comprising:
circuitry configured to
input an operation of a user for designating an arbitrary cutout range on a screen of a high-definition video image content;
produce picture frame information based on the inputted operation, the picture frame information defining a user-defined sub-region of the high-definition video image content and including a user-defined position of the cutout range;
transmit the produced picture frame information, defining the user-defined sub-region of the high-definition video image content, to a content transmission apparatus; and
receive an arbitrary picture frame content which is signaled from the content transmission apparatus in response to the transmitted picture frame information and whose cutout range designated by the user and corresponding to the user-defined sub-region is cut out from the high-definition video image content.

9. The content reproduction apparatus according to claim 8, wherein the circuitry is further configured to convert the definition of the received arbitrary picture frame content.

10. The content reproduction apparatus according to claim 9, wherein
the user-defined position is an initial position of the cutout range, and
the picture frame information further includes a moving amount per unit time.

11. The content reproduction apparatus according to claim 10, wherein the picture frame information further includes an enlarging or reducing amount of the cutout range per unit time.

12. A content reproduction method for a content reproduction apparatus, comprising:
inputting, by circuitry of the content reproduction apparatus, an operation of a user for designating an arbitrary cutout range on a screen of a high-definition video image content;
producing, by the circuitry of the content reproduction apparatus, picture frame information based on the inputted operation, the picture frame information defining a user-defined sub-region of the high-definition video image content and including a user-defined position of the cutout range;
transmitting the produced picture frame information, defining the user-defined sub-region of the high-definition video image content, to a content transmission apparatus; and
receiving an arbitrary picture frame content which is signaled from the content transmission apparatus in response to the transmitted picture frame information and whose cutout range designated by the user and corresponding to the user-defined sub-region is cut out from the high-definition video image content.

13. A non-transitory computer-readable storage medium storing a program for causing a computer to perform a content reproduction method comprising:
inputting, by the computer, an operation of a user for designating an arbitrary cutout range on a screen of a high-definition video image content;
producing, by the computer, picture frame information based on the inputted operation, the picture frame information defining a user-defined sub-region of the high-definition video image content and including a user-defined position of the cutout range;
transmitting the produced picture frame information, defining the user-defined sub-region of the high-definition video image content, to a content transmission apparatus; and
receiving an arbitrary picture frame content which is signaled from the content transmission apparatus in response to the transmitted picture frame information and whose cutout range designated by the user and corresponding to the user-defined sub-region is cut out from the high-definition video image content.

14. A content delivery system, comprising:
a content transmission apparatus including circuitry configured to
   retain a high-definition video image content,
   receive picture frame information transmitted from a content reproduction apparatus, the picture frame information defining a user-defined sub-region of the high-definition video image content,
   calculate a cutout range corresponding to the user-defined sub-region of the high-definition video image content based on the received picture frame information, the received picture frame information including a user-defined position of the cutout range,
   cut out the calculated cutout range from the high-definition video image content, and
   signal an arbitrary picture frame content configured from a result of the cutout, from the high-definition video image content, to the content reproduction apparatus,
the content reproduction apparatus including circuitry configured to
   input an operation of a user for designating an arbitrary cutout range on a screen of the high-definition video image content,
   produce the picture frame information, defining the user-defined sub-region of the high-definition video image content, based on the inputted operation,
   transmit the produced picture frame information, defining the user-defined sub-region of the high-definition video image content, to the content transmission apparatus, and
   receive the arbitrary picture frame content which is configured from the result of the cutout from the high-definition video image content and is signaled from the content transmission apparatus in response to the transmitted picture frame information.

15. The content transmission apparatus according to claim 1, wherein the picture frame information is designated by a user of the content reception apparatus.

* * * * *